United States Patent [19]
Pollinger

[11] 3,786,763
[45] Jan. 22, 1974

[54] PNEUMATIC SUSPENSION AND CONTROL SYSTEM FOR RAILWAY VEHICLES
[75] Inventor: Hans Pollinger, Munich, Germany
[73] Assignee: Knorr-Bremse GmbH, Munich, Germany
[22] Filed: Feb. 25, 1971
[21] Appl. No.: 118,886

[30] Foreign Application Priority Data
Feb. 26, 1970 Germany............................ 2009025

[52] U.S. Cl.......... 105/199 R, 105/164, 105/197 B, 105/210, 267/65 D
[51] Int. Cl......... B60g 21/06, B61f 5/10, B61f 5/24
[58] Field of Search.... 105/197 B, 199 R, 164, 210; 267/3, 4, 65 D; 280/124 F

[56] References Cited
UNITED STATES PATENTS
| 3,022,749 | 2/1962 | Voertman et al. | 105/199 R |
| 2,947,532 | 8/1960 | Christensen | 267/65 D |
| 3,094,341 | 6/1963 | Alfieri | 280/124 F |
| 2,908,230 | 10/1959 | Dean | 105/197 B X |
| 2,982,466 | 5/1961 | Pier | 267/3 X |

FOREIGN PATENTS OR APPLICATIONS
| 1,207,222 | 12/1965 | Germany |
| 1,215,192 | 4/1966 | Germany |
| 1,217,803 | 5/1966 | Germany |
| 1,217,804 | 5/1966 | Germany |

Primary Examiner—Gerald M. Forlenza
Assistant Examiner—Howard Beltran
Attorney, Agent, or Firm—Edmund M. Jaskiewicz

[57] ABSTRACT

The body of a railway vehicle is supported on both sides by air bellows mounted between the body and a pivotable truck. An air control valve having an actuating handle is connected between a source of air under pressure and a bellows. A lever connects each actuating lever with a point on the longitudinal side of a truck, the points on the truck being horizontally displaced with respect to each other as the truck pivots with respect to the vehicle body as the vehicle moves along a curved path. The pivotal movement of the truck causes movement of the lever which actuates the control valves to increase the pressure in the bellows on the outside of the curve and to decrease the pressure in the bellows on the inside of the curve to tilt the vehicle toward the inside of the curve.

7 Claims, 8 Drawing Figures

PATENTED JAN 22 1974 3,786,763

PNEUMATIC SUSPENSION AND CONTROL SYSTEM FOR RAILWAY VEHICLES

The present invention relates to an air suspension system for railway vehicles, more particularly, to the actuation of the bellows supporting the sides of the railway vehicle in response to movement of the vehicle along a curved path.

Air suspension systems for vehicles generally comprise an air bellows which functions as a cushion or spring positioned between a portion of the vehicle which is not resiliently mounted and a portion of the vehicle which is spring supported. An air spring valve controls the compressed air introduced into the respective bellows as a function of the distance between these two portions of the vehicle. The air spring valve is generally mounted on the resiliently supported component of the vehicle and is connected to the unsupported component by a lever rod system which actuates the control valve.

Railway vehicles also have been provided with such a pneumatic suspension system having the elements as generally described above. In such applications the lever rod system is generally located near a side of the vehicle and at approximately the central portion of a longitudinal side of the truck frame. The system basically consists of a vertical lever whose lower end is pivotally connected to the truck and whose upper end is pivotally connected to a substantially horizontal lever which is in turn connected to an actuation shaft of the air control valve.

When a vehicle, such as a railway vehicle, having a pneumatic suspension system as described above passes along a curved path, centrifugal forces act upon the vehicle body as it proceeds along the curved path. These forces tend to incline the vehicle body toward the outside of the curve. The air bellows on the side of the vehicle on the outside of the curve are thus compressed and those bellows on the inside of the curve are relieved of pressure. These variations in the height of the bellows actuate air control valves which in turn increase further the pressure in the outside bellows so as to counteract the inclination of the vehicle because of centrifugal forces. This counteracting effect is continued until the vehicle body returns to its upright position against the effects of the centrifugal forces.

When the vehicle leaves the curved path and enters a straight track the vehicle body will tend to be inclined toward the inside of the curve which the vehicle has just left after the centrifugal force effect has disappeared. This tilting will occurr because of the differential between the pressures in the air bellows on the two sides of the vehicle. This tilting of the vehicle is subsequently eliminated by the air control valves which introduce suitable pressure changes into the respective bellows. This tilting of the vehicle because of centrifugal force and the resulting counteracting of the tilting generally result in an unpleasant swaying of the vehicle as it passes through a curve because the mechanism for actuating the control valves is not sufficiently sensitive to be immediately responsive to changes in direction of travel of the vehicle.

Various control systems have been proposed for eliminating the swaying of the railway vehicles as they pass along curvilinear paths. These control systems essentially release forces that counteract the tilting of the vehicle body occurring as a result of centrifugal forces. Such control systems have had the disadvantage of being relatively expensive in their manufacture, installation and maintenance, and thus have added significantly to the cost of operation of such vehicles.

It is therefore an object of the present invention to provide a novel and improved air suspension system for vehicles.

It is another object of the present invention to provide an air suspension system of the type described herein which counteracts the swaying of the vehicle moving along a curved path in a simple and effective manner.

It is an additional object of the present invention to provide an apparatus for actuating the air suspension system of a vehicle to counteract centrifugal forces acting upon a vehicle moving along a curved path which can be quickly and easily installed and maintained.

According to one aspect of the present invention a railway vehicle has a truck pivotably mounted on the vehicle body and an air suspension system comprising air bellows are positioned between the body and the truck to support both sides of the vehicle. Air control valves are mounted on the body to interconnect a source of air under pressure and the air bellows on both sides of the vehicle. The air control valves on both sides of the vehicle body are connected by lever means to points on the truck which are displaceable horizontally with respect to each other upon pivoting of the truck with respect to the vehicle body as the vehicle moves along a curved path. The displacement of the lever connecting points on the truck actuates the air control valves to increase the pressure in the bellows on the outside of the curve so as to tilt the vehicle toward the inside of the curve.

Each air control valve has a substantially horizontally extending actuating lever which is connected to a second lever by an upper pivotable connection. The other end of the second lever is connected by a lower pivotable connection to the point on the truck. The upper pivotable connection on the left side of the vehicle is displaced in a clockwise direction with respect to its lower pivotable connection with reference to a substantially horizontal circle having its center at its pivot connection of the truck to the body. The upper pivotable connection on the right side of the vehicle is displaced in a counterclockwise direction with respect to its lower pivotable connection with reference to the same circle. These displacements exist when the truck is parallel to the vehicle body.

The lever rod actuating system disclosed as the present invention for controlling the air pressure to the bellows on both sides of the vehicle to counteract tilting of the vehicle body is immediately operative as the railway vehicle enters a curve. The lever system is thus operative even before the vehicle is tilted as result of centrifugal force.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
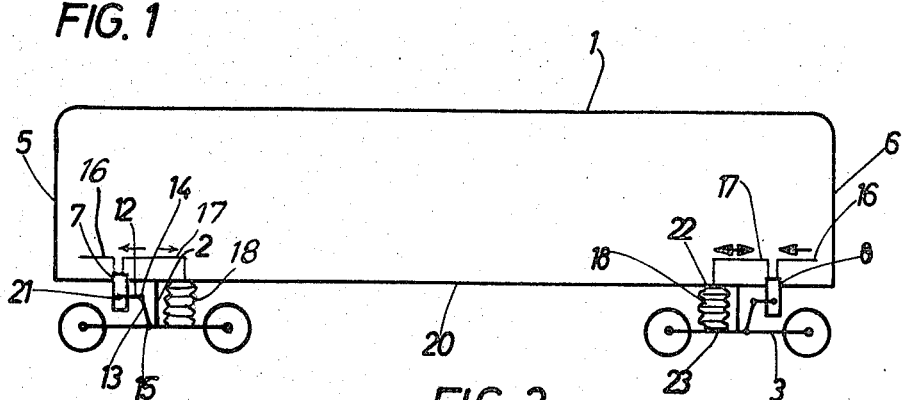
FIG. 1 is a side elevational view of a railway vehicle incorporating the present invention when the vehicle is travelling along a straight path.
Figure 2:
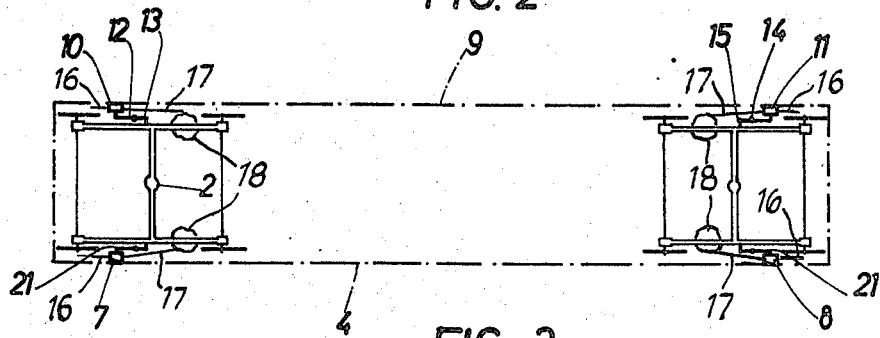
FIG. 2 is a top plan view of the trucks of the vehicle shown in FIG. 1.

As may be seen in FIGS. 1 and 2 a vehicle body 1 is pivotably mounted upon trucks 3 with each truck being pivotable about a vertical axis 2. Longitudinal sides 4 and 9 of the vehicle are connected at their ends by end walls 5 and 6. The bottom of the body 1 is indicated at 20 and has pneumatic spring control valves 7 and 8 mounted on side 4 adjacent end walls 5 and 6 respectively and pneumatic control valves 10 and 11 mounted on the lower portion of side wall 9 adjacent end walls 5 and 6 respectively.

Each of the control valves 7, 8, 10, 11 is provided with a horizontally extending actuating lever 12 connected to an actuating shaft 21 which is pivotably mounted in the respective control valves. A substantially vertical lever 13 is connected to actuating lever 12 at an upper pivotable connection 14 and to a lower pivotable connection point 15 on the truck frame 3. A separate air line 16 connects each of the control valves 7, 8, 10, 11 to a source of compressed air (which is not illustrated). A separate air line 17 connects each of the control valves with its respective air spring bellows 18. The upper end 20 of each bellows 18 bears against the bottom 20 of vehicle body 1 and the lower end thereof 23 is mounted upon truck frame 3. Through the lines 16 and 17 a certain pressure head which is a function of the vehicle load is introduced into each of the bellows 18.

Figure 3:
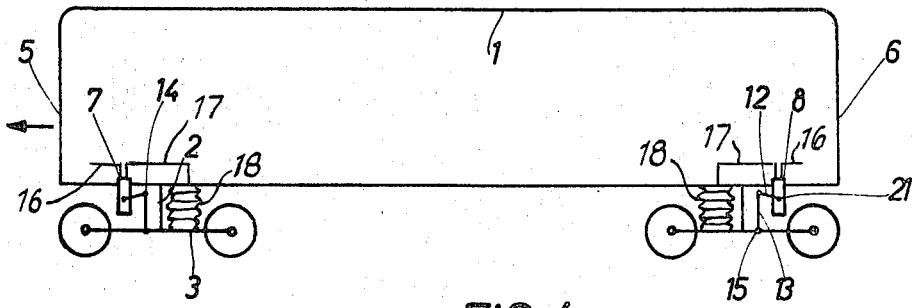
FIG. 3 is a view similar to that of FIG. 1 but showing the vehicle as it is moving along a curved path.
Figure 5:
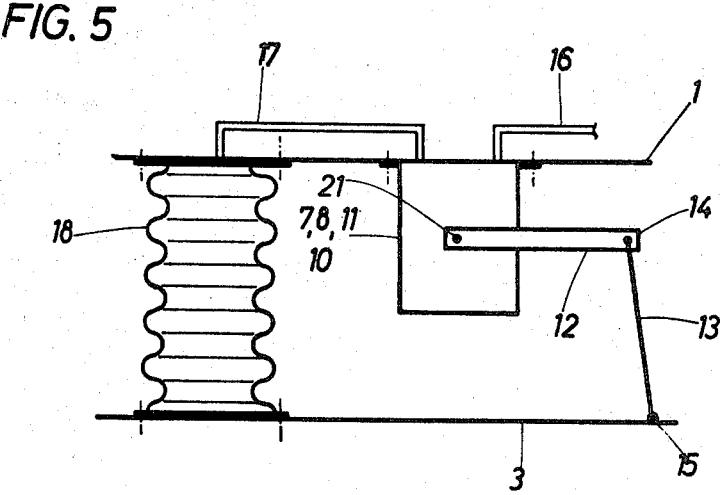
FIG. 5–7 are side elevational views of the lever system according to the present invention in different operative positions.

When the vehicle is travelling in a straight line the components as described above will have the positions as shown in FIGS. 1 and 2. During this straight line travel each of the bellows 18 will be subjected to such a pressure through the control valves 7, 8, 10, 11 that the vertical distance between the body 1 and the truck frames 3 is substantially constant. The valves will be closed since the lever system is so positioned to maintain the actuating lever 12 in its horizontal position. The lever system will have the position as shown in FIG. 3 wherein the lower pivotable connection 15 on the truck 3 is displaced from the upper pivotable connection 14 in a direction away from the adjacent ends 5, 6 of the vehicle body. The substantially vertical lever 13 is a slight angle as shown in FIG. 5 and in this position the control valve is closed.

Figure 4:
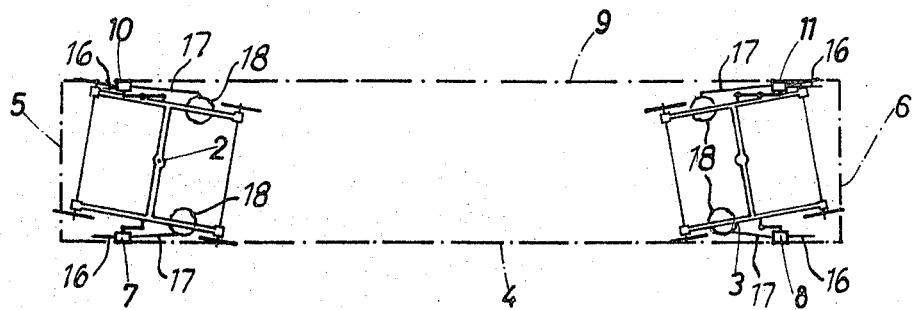
FIG. 4 is a view similar to that of FIG. 2 of the vehicle shown in FIG. 3.

Assuming that the vehicle is moving to the left as viewed in FIGS. 3 and 4 and indicated by the arrow at end wall 5 in FIG. 3 and the vehicle enters a curve to the right, the centrifugal forces appearing subsequent to the entry of the vehicle into the curve will tend to incline the vehicle toward the outside of the curve. The air bellows 18 is located on the outside of the curve or along longitudinal wall 4 will then be compressed and the bellows 18 on the inside of the curve on longitudinal wall 9 will be relieved of pressure. In order to prevent the undesirable tilting of the vehicle body toward the outside of the curve as the vehicle moves along the curvilinear path, the air control valves 7 and 8 located on the outside of the curve are actuated to introduce an increased pressure into the respective bellows to oppose the effect of the centrifugal force. At the same time, the air control valves 10, 11 reduce the pressure correspondingly in the bellows 18 located on the inside of the curve.

Figure 6:
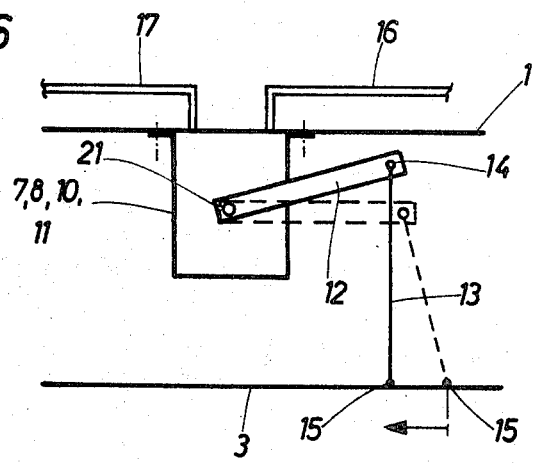

As the vehicle moves along the curved path as described above and the truck frame 3 is pivoted as shown in FIG. 4 the pivot connection 15 of the lever 13 on the truck 3 will be displaced horizontally toward the left in the direction indicated by the arrow shown in FIG. 6. This movement to the left of pivot point 15 will move the actuating lever 12 upwardly as also shown in FIG. 6 to introduce air under pressure through line 17 to the respective bellows 18 located on the outside of the curve. It is seen that the upward movement of actuating lever 12 will pivot actuating shaft 21 of the control valve and the increase in pressure in the bellows will be a function of the magnitude of relative movement, and accordingly of the curve to be transversed by the vehicle. In this manner the increase in air pressure in the bellows 18 located on the outside of the curve will counteract the effect of the centrifugal force and tend to tilt the vehicle toward the inside of the curve.

Figure 7:
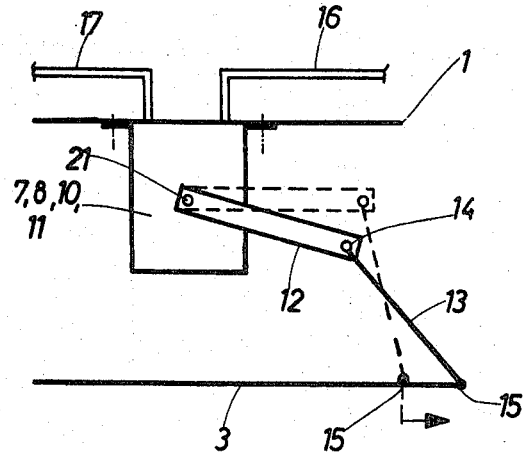

The air control valve 10, 11 located on the inside of the curve at the same time are actuated into an air discharge position by the lever movement as shown in FIG. 7. The pivotable movement of the truck 3 will cause a horizontal displacement of the pivotable connection 15 toward the ring as shown by the arrow in FIG. 7. This will lower actuating lever 12 as shown in FIG. 7 and cause a rotation of the actuating shafts 21 in the air control valves 10, 11 so as to effect a corresponding pressure decrease in the bellows 18 located on the inside of the curve. This reduction in pressure in the bellows on the inside of the curve together with the increase in pressure in the bellows on the outside of the curve, as described above, will tilt the vehicle body toward the inside of the curve to oppose centrifugal force. The above described changes in the bellows 18 on both sides of the vehicle will bring about a variation in the heights of the bellows so as to overcome the centrifugal forces and thus tilt the vehicle toward the inside of the curve.

Figure 8:
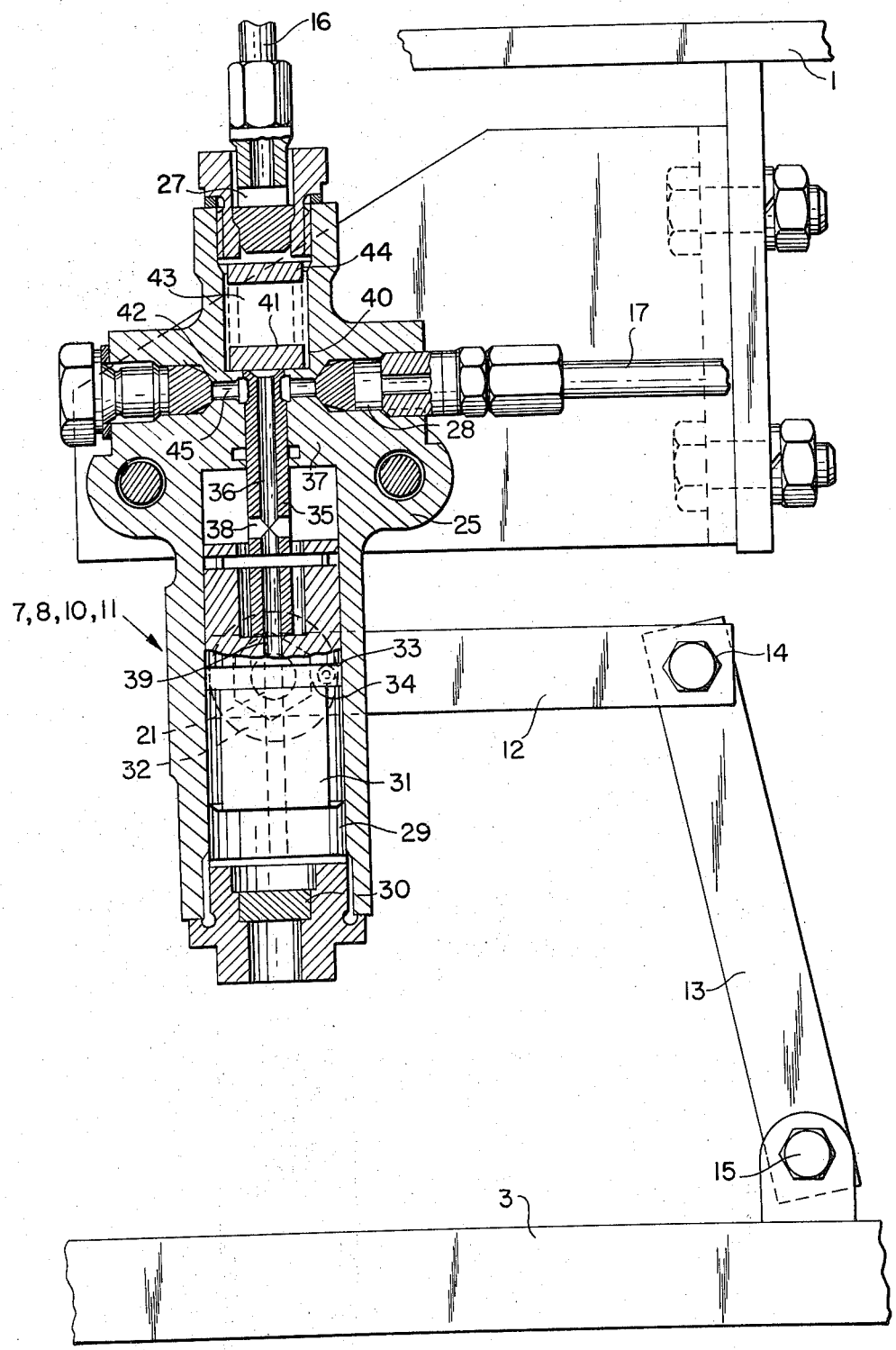
FIG. 8 is a sectional view of the air control valve and showing the connection of the valve to the lever system of the present invention.

The air control valves 7, 8, 10 and 11 are shown in greater detail in FIG. 8. This valve is one known in the art and has been previously used by the present assignee in the control of air in railway vehicles. The valve comprises a housing 25 which is mounted on a substantially L-shaped bracket 26 secured to the underside of the vehicle body 1. The housing 25 has two connections 27 and 28 for air lines 16 and 17. Within the housing 25 there is a chamber 28 which connects to the atmosphere through a filter 30 and in which is mounted a piston 31. The piston 31 is operable to move axially by means of the levers 12 and 21 through a cam 32. The cam 32 has a follower pin 33 which is eccentrically positioned and movable within a recess 34 of the piston 31. The piston 31 has a valve stem 35 within which is an inner bore 36 and the stem being movable axially within an intermediate wall 37 of the housing 25. The inner bore 36 has openings 38 and 39 which connect with the chamber 29 and to the atmosphere. The valve stem 35 has its end engagable with a seat 40. In the illustrated normal position of the valve levers 12 and 13 as shown in FIG. 5, the valve seat 40 rests upon a valve plate 41 which in turn is positioned on a valve seat 42 fixed to the housing. The valve plate 41 separates a housing chamber 43 which is connected to line 16 by means of a check valve 44 and the connection 27 from the connection 28 through the chamber 45.

In summary, as the vehicle passes along a curve the pressure in the bellows on the vehicle on the outside of the curve will be increased by the action of the lever system as illustrated in FIG. 6 and the pressure in the bellows on the vehicle in the inside of the curve will be decreased in accordance with the action of the lever system as shown in FIG. 7. The combined effect will be to tilt the body of the vehicle to the inside of the curve to counteract the effect of centrifugal force.

As the vehicle emerges from the curve to enter a straight section of track the pivotable connections 15 on the truck will be displaced opposite to the directions indicated by the arrows in FIGS. 6 and 7. The actuating levers 12 will then be returned to their horizontal positions as indicated by the dashed lines in FIGS. 6 and 7 so that the pressure in the bellows controlled by the valves 7, 8 will be reduced and the bellows controlled by the valves 10, 11 will be increased. This will gradually lower the outside edge 4 of the vehicle and gradually raise the inside edge 9 of the vehicle body until the body assumes its original horizontal position for movement along a straight or rectilinear path.

Thus it can be seen that the undesirable swaying of the vehicle body generally encountered during the travel of a vehicle through a curve is avoided without the necessity for incorporating additional controls in the vehicles equipped with the penumatic suspension system as described herein. The individual bellows of the suspension system are connected to control valves immediately upon the vehicle entering a curve and before the effects of centrifugal force are imposed on the vehicle. Thus, the arrangement for actuating the control valves to control the increase or decrease in pressure to the bellows on the outside and inside of the vehicle is accomplished by the simple mechanism responsive to the pivotal movement of the truck with respect to the vehicle body.

It is understood that this invention is susceptible to modification in order to adapt it to different usages and conditions and, accordingly, it is desired to comprehend such modifications within the invention as may fall within the scope of the appended claims.

What is claimed is:

1. In a railway vehicle having an air cushion suspension system the combination of a vehicle body, a truck pivotably mounted on said vehicle body and pivotable about a vertical axis, air bellows means between the body and the truck for supporting both sides of the vehicle body, air control valve means on the vehicle body between a source of air under pressure and said air bellows means, and lever means interconnecting said air control valve means and points on said truck displaceable horizontally with respect to each other upon pivoting of the truck with respect to the vehicle body as the vehicle moves along a curve path for actuating said air control valve means in response to pivotal movement of said truck to increase the pressure in the bellows on the outside of the curve so as to tilt the vehicle toward the inside of the curve.

2. In a railway vehicle as claimed in claim 1 wherein said lever means comprises points on said truck at the opposite longitudinal sides thereof.

3. In a railway vehicle as claimed in claim 1 wherein an air control valve means is on each side of the vehicle body and connected to the bellows means on the respective side of the vehicle.

4. In a railway vehicle as claimed in claim 3 wherein said lever means is pivotably connected to the points on the truck.

5. In a railway vehicle as claimed in claim 3 wherein said air cushion valve means comprises a substantially horizontally extending actuating lever, said lever means comprising a lever on each side of the vehicle pivotably connected with said actuating lever to define an upper pivotable connection and pivotably connected to a point on the truck to define a lower pivotable connection, the upper pivotable connection on the left side of the vehicle being displaced in a clockwise direction with respect to its lower pivotable connection with reference to a substantially horizontal circle having its center at the pivot connection of the truck to the vehicle body and the upper pivotable connection on the right side of the vehicle being displaced in a counter clockwise direction with respect to its lower connection with reference to the same circle when the truck is parallel to the vehicle body.

6. In a railway vehicle as claimed in claim 5 wherein a lever system is adjacent each side of the vehicle and is in a vertical plane parallel to the longitudinal axis of the vehicle, each upper pivotable connection being disposed closer to the adjacent end of the vehicle with respect to its lower pivotable connection.

7. In a railway vehicle as claimed in claim 6 wherein each said lever system is substantially at the center of the longitudinal side of a truck.

* * * * *